Aug. 15, 1939          C. PFANSTIEHL          2,169,966
SMALL SHAPED METALLIC OBJECT
Filed Nov. 28, 1938
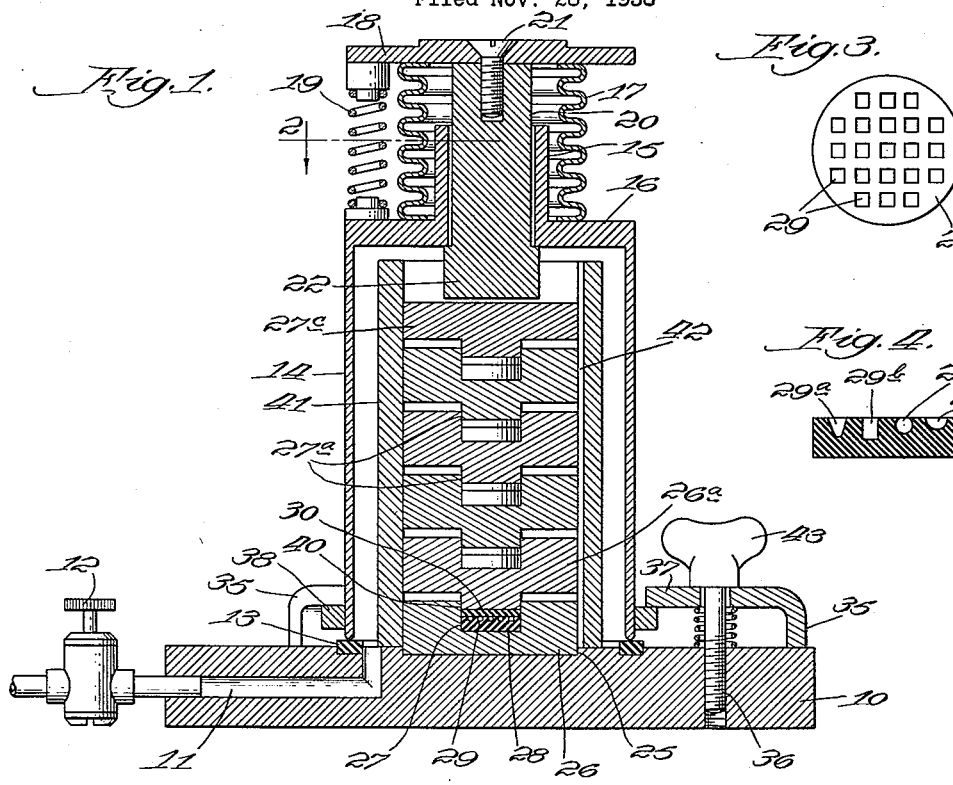
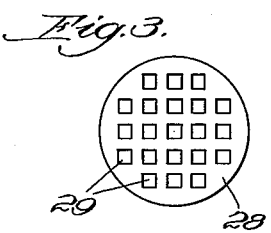
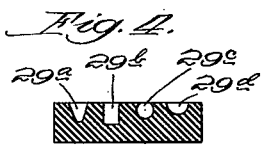
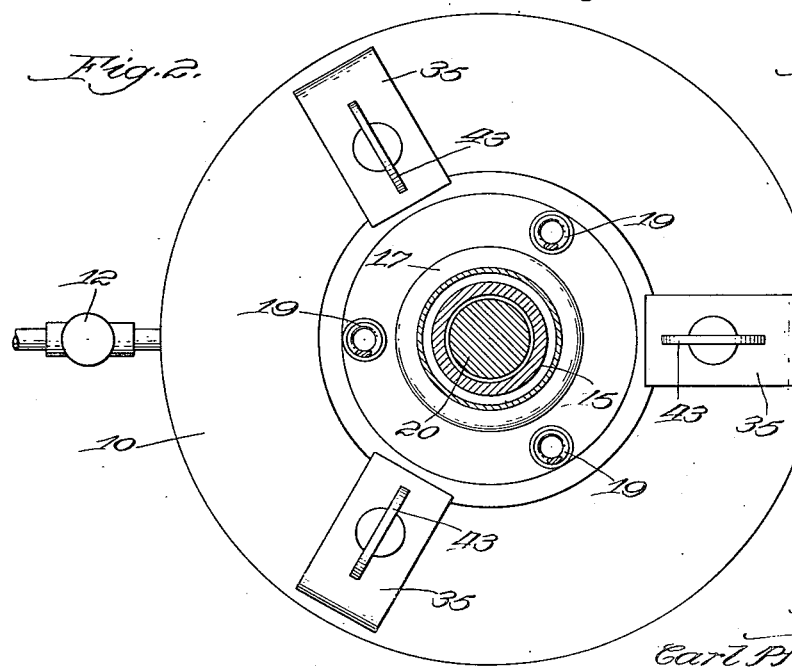

Patented Aug. 15, 1939

2,169,966

UNITED STATES PATENT OFFICE 2,169,966

SMALL SHAPED METALLIC OBJECT

Carl Pfanstiehl, Highland Park, Ill., assignor to Pfanstiehl Chemical Company, a corporation of Illinois Application November 28, 1938, Serial No. 242,865

1 Claim. (Cl. 29—148)

This invention relates to small shaped metallic objects and particularly to such objects not substantially over one four-thousandth of a cubic inch in volume.

The pressing of metallic objects from powdered metallic particles is now well-known, but the development of suitable dies or methods for forming extremely small objects has hitherto been thought impracticable.

For example, the preforming of points for pen nibs, phonograph needles, meter pivots, or similar small objects, by pressing has hitherto been a very expensive process, and the objects formed by the previously known methods have not had the uniformity of size and structure desired.

In accordance with this invention, a method is provided for forming in a very cheap and simple manner small objects of predetermined size and shape, primarily of geometric patterns and of a uniformity of structure hitherto impossible in such small objects.

An apparatus suitable for carrying out the invention is illustrated in the drawing, in which Fig. 1 is an elevation, partly in section, of the apparatus; Fig. 2 is a sectional plan view of the apparatus shown in Fig. 1; Fig. 3 is a top view of a mold; Fig. 4 is a sectional view through a modified mold; and Fig. 5 is a sectional view of another modified form of die.

As shown in the drawing, the apparatus comprises a base 10 pierced by a conduit 11 controlled by a valve 12 and leading to a vacuum pump (not shown). Resting upon the base 10 and separated therefrom by a rubber gasket 13 is a cylindrical container 14 provided with a neck 15 and to the shoulder 16 of which is welded or soldered a flexible Sylphon 17 of copper or other suitable material. The Sylphon is welded or soldered at the top to a plate 18, which is pressed upwardly by the springs 19. These springs are designed to offset the pressure of the atmosphere when the interior of the container is evacuated, and to prevent premature compression of the dies.

A plunger 20 is fastened by the screw 21 to the plate 18 and is preferably provided with an enlarged head 22.

A slight depression 25 is provided in the base 10 and within this is nested a die block 26 having a depression 27 in its upper surface, within which the die 28 closely fits.

The die 28 is made of a plastic, preferably elastic, substantially incompressible material, preferably rubber, such as rubber known as squeegee rubber, and is provided with a number of cavities 29 in its upper surface. The die is preferably not of great thickness, in order that there will not be any appreciable sliding of the die along the sides of the die block. On the other hand, there should be an amount of material below the cavities sufficient to prevent flowage or distortion of the material.

Therefore, if the type 28a of die shown in Fig. 5 is employed, a suitable rubber washer should be applied above and below the die itself.

For penpoint and similar purposes a die approximately ⅛ of an inch in thickness is satisfactory, and the cavities may be slightly more than one half of this thickness. A washer 30 is placed on the top of the die and the washer may suitably be about $\frac{1}{16}$ of an inch thick.

The cavities in the die are made of precisely the same shape desired in the finished article, but are very considerably larger than the article itself, because of the change in the apparent density of the article which occurs upon compression. For most metallic powders, such as tungsten, osmium, iridium, or the like, the powder is compressed to one-half to one-quarter of the original volume under the necessary pressures.

In Fig. 4 a die is shown, in which a number of different shaped cavities are provided. 29a, for example, being suitable for a phonograph needle, 29b being a cylinder, 29c a spheroid, and 29d a hemisphere. In making a complete sphere, two molds such as 29d may be employed, being placed together in registration in any suitable manner before pressing.

Instead of elastic bodies, plastic inelastic materials may be employed, such as soft metal, say, lead. The use of an elastic body is greatly preferred because the die does not have to be destroyed after one use.

The container 14 is secured to the base 10 by fasteners 35, which are pivotally mounted at 36 and the edges 37 of which overhang the flange 38 on the container.

In the operation of the device, powdered metallic material is carefully sifted into the cavities 29. In general the powder is around 100 to 300 mesh. Too fine a material is likely to lower the apparent density below the normally desirable amount, and on the other hand, if the material is too coarse, it will not fill the cavities uniformly, nor will it bind as easily. Moreover, where a plurality of metallic materials are mixed, for example in forming an osmium-iridium or platinum alloy, uniformity of composition will not be accomplished with too large particles.

In operating with the plastic die it is, however, possible to use extremely fine material, which could not be employed with the ordinary rigid or inelastic die, such as steel. For example, many very fine powders will creep in a steel die but will show no such tendency with rubber.

For this reason, the process may be employed to form objects to a predetermined weight, even where the shape is not important. For example, where it is desired to form pellets, powder may be sifted into a depression in a plastic mold, and then tamped down slightly, if necessary, the tamping always being uniform, and then subjected to pressure. In this way, it is possible to procure pellets of uniform weight much more exactly and readily than in any other known method.

Sifting is preferred because there is no tendency to overpack or compress the powder in spots, but a vibrator may be employed to vibrate the dies while the material is falling into it. This is particularly desirable in case of a cavity shaped like 29c.

After the cavities have been filled, the upper surface is scraped with a flat edge and a die is placed in the die-block 26 and covered with a washer 30. A second die-block 26a is then placed on top of the first die-block, the second one having a lug 40 registering with the depression 27. The die-block 26a likewise has a die receiving depression 27a, in which a second die and washer are placed and this nesting of die-blocks is continued until the container is filled to the desired height. A closing die-block 27c is placed on top of the last die and is just below the plunger 22. A steel sleeve 41 closely fits the die-blocks and is provided with a longitudinal groove 42 to permit ready passage of air into and out of the die-blocks.

The separate nesting of the dies is of importance, because it is desirable not to have any die move any considerable distance with respect to the walls enclosing it. If a number of dies were piled on top of each other, the movement of the upper ones would be cumulative, whereas in the present arrangement, the cumulation is taken up between the die blocks.

After the dies are properly mounted the container 14 is placed over them and the fasteners 35 secured by the wing nuts 43. The three-way valve 12 is then opened to a vacuum pump and the container evacuated, the springs 19 holding the plate 18 from compression by atmospheric pressure. Pressure is then applied on the plate 18 and operates through the plunger 20 to compress the dies under any suitable pressure. For most purposes a pressure of 35 to 70 tons per square inch is suitable.

The desired pressure will, of course, depend upon the character of the material being compressed as well as the purposes for which it is intended. Higher pressure gives harder products.

Under a pressure of 70 tons per square inch, a series of 5 dies and washers $\frac{1}{8}$ of an inch in thickness and $\frac{1}{16}$ of an inch in diameter and each containing 21 rectangular cavities approximately $\frac{5}{128}$ inch by $\frac{5}{128}$ inch, the washers being approximately $\frac{1}{16}$ of an inch thick, will compress less than $\frac{1}{8}$ of an inch total when filled with metallic powder having a 3 to 1 compression ratio.

The pressure need not be maintained more than a few seconds, and after release, air or other gas is admitted to the container and the resulting pellets are removed from the dies. For some purposes, it is desirable that the gas be inert, such as hydrogen.

The pellets may then be treated in any desired manner, for example, by heat treatment below the melting point for a prolonged period.

The process is particularly suitable for the manufacture of small tips to be welded automatically to bases of considerably larger size, particularly pen points, phonograph needles, meter pivots, and the like. In such operations, it is quite valuable to have pieces of predetermined and uniform size and shape, so that the welding operation may proceed automatically and uniformly.

In the case of pen points, the particles are made from powdered pen point material, generally of a hard corrosion resistant metal or alloy, and are made of a size preferably to produce 1800 to 10,000 pellets per troy ounce from material having a specific gravity as high as 18. A typical cube may have a side of .040 inch. The objects preferably will not exceed approximately .06 inch on a side, this being approximately $\frac{1}{16}$ of an inch on a side. It is preferable that the finished article does not exceed $\frac{1}{4000}$ of a cubic inch in volume.

In some instances it may be desirable to omit the top washer or to use a washer of a rigid material. This provides a more smooth and shiny surface where the metal contacts metal.

This application is a continuation in part of my co-pending application 173,036, filed November 5, 1937.

I claim:

A metallic tip for small bases comprising a small preformed body of predetermined shape, the body being not substantially more than $\frac{1}{4000}$ of a cubic inch in volume and having all of its dimensions less than $\frac{1}{8}$ inch, having the uniformity of structure and strength resulting from compression of finely divided metallic particles under heavy pressure in a cavity in a substantially incompressible plastic body having all of its dimensions less than $\frac{1}{8}$ inch, to a coherent mass of the predetermined shape but materially smaller in volume than the cavity.

CARL PFANSTIEHL.